July 11, 1967

F. K. ULRICH
3,330,993

PROTECTIVE CIRCUITRY FOR AN IGNITRON FIRING CIRCUIT

Filed July 23, 1964

INVENTOR.
FREDERICK K. ULRICH
BY
Woodhams, Blanchard & Flynn
ATTORNEYS

United States Patent Office 3,330,993
Patented July 11, 1967

3,330,993
PROTECTIVE CIRCUITRY FOR AN IGNITRON FIRING CIRCUIT
Frederick K. Ulrich, East Detroit, Mich., assignor to Robotron Corporation, Detroit, Mich., a corporation of Michigan
Filed July 23, 1964, Ser. No. 384,760
5 Claims. (Cl. 317—33)

ABSTRACT OF THE DISCLOSURE

A pair of SCR's connected across the pool and anode of respective ignitrons are provided with protective circuitry, in addition to series and parallel linear transient inhibiting elements. The protective circuitry comprises a unitary pi network having a series RC bight portion disposed between the anodes of the SCR's for absorbing forward transient voltages appearing thereon and further having a pair of legs each connected between a corresponding SCR anode and ignitron pool including a back to back blocking diode and Zener diode oriented for shunting excessive reverse voltages around the corresponding SCR and ignitor-pool junction of the ignitron. A further protective circuit embodiment provides a back to back diode Zener diode set across the SCR to shunt reverse voltages above a predetermined level therearound.

---

This invention relates to a firing circuit for an ignitron and, more particularly, relates to a protective circuit for an ignitron firing circuit including a semiconductor controlled rectifier.

It has often been common practice in the past to provide a firing circuit for an ignitron which includes a thyratron tube connected to the ignitor of the ignitron. More specifically, it has been common practice, particularly in resistance welding circuits, to connect a thyratron between the ignitor and anode of an ignitron, the anodes of said ignitron and thyratron being connected to each other, whereby conduction through the thyratron fires the ignitron. In fact, a workable circuit may require only the addition of a resistance in series with the thyratron to limit the amount of firing current to such ignitor. As a further step, devices such as fuses and the like are often provided to prevent excessive current flow forwardly through the thyratron to prevent damage thereto and to prevent excessive ignitor current.

Recently, however, attempts have been made to provide an ignitron firing circuit in which a semiconductor controlled rectifier (hereinafter referred to as an SCR) is substituted substantially directly in the place of the older thyratron tube. Use of an SCR in place of a thyratron tube in such firing circuits has been advantageous in a number of ways including a reduction in component size, increased electrical efficiency, no filament supply circuit required, and the like. Such substitution has led to some difficulty in that damage has occurred to SCR's used in such circuits when the mercury pool and ignitor of the ignitron is positive with respect to the anode thereof. Such a condition creates a reverse voltage on the SCR. Often transient reverse voltages thus appearing on the SCR are sufficiently high in magnitude as to break down said SCR and cause reverse conduction therethrough which destroys the SCR for further use. Forward voltage transients may also been encountered which while generally not harming the SCR may cause spurious conduction therethrough, that is, conduction in the absence of the normally required gate signal.

Accordingly, the objects of this invention include:

(1) To provide protective circuitry in an SCR firing circuit for an ignitron for preventing spurious conduction through and damage to said SCR.

(2) To provide circuitry, as aforesaid, for preventing application of high reverse voltages to the SCR and to provide means by which currents generated by such high reverse voltages are bypassed around the SCR.

(3) To provide circuitry, as aforesaid, particularly adapted to preventing application of high reverse transient voltages to said SCR.

(4) To provide circuitry, as aforesaid, for preventing application of excessive forward voltage transients to said SCR but which does not interfere materially with the application of normal forward voltages across said SCR.

(5) To provide circuitry, as aforesaid, comprising components which are currently well known and which have been produced in quantity for a relatively long period of time, which components are inexpensive and widely available and which are known to be reliable whereby said circuitry will be economical to provide, will not substantially increase the cost of the firing circuit in which it is used and will be capable of a long and substantially trouble-free service life.

Other objects and purposes of this invention will be apparent to persons acquainted with apparatus of this general type upon reading the following specification and inspecting the accompanying drawing.

Description

Figure 1:
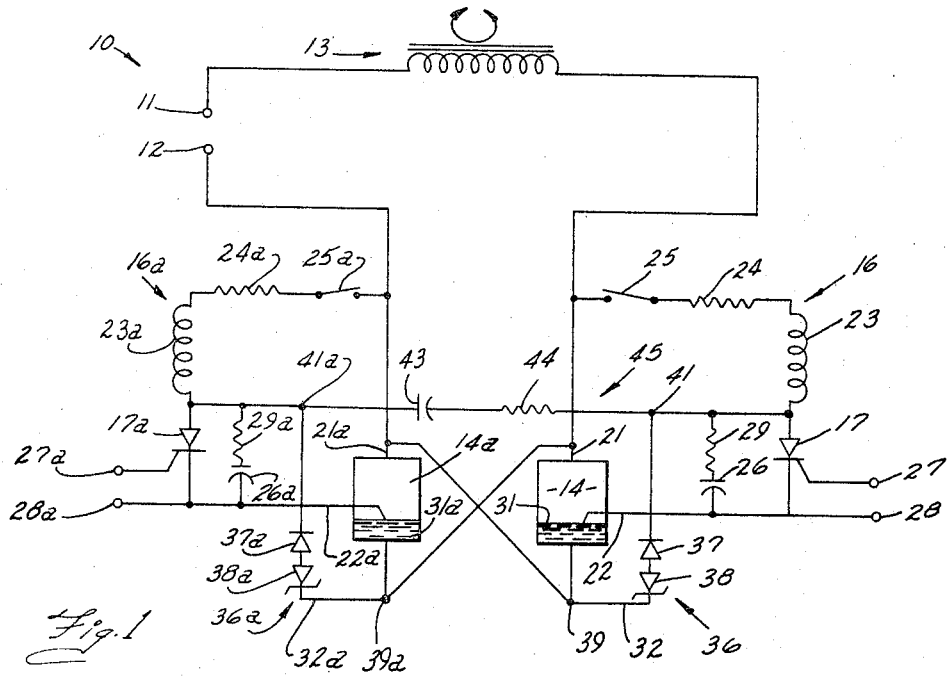
FIGURE 1 is a schematic diagram of an ignitron circuit including firing circuitry embodying the invention.

Turning now to FIGURE 1 of the drawing, a power circuit 10 is disclosed including a pair of power input terminals 11 and 12 in series with a load 13 and a back-to-back connected pair of ignitrons 14 and 14a. The power terminals 11 and 12 will normally be connected to a source of alternating potential capable of supplying the desired current to the load 13. The load 13 may be of any desired type and is here shown, for purposes of illustration, to comprise the primary winding of a resistance welding transformer. The ignitrons 14 and 14a are connected in a back-to-back relationship for conducting current of alternating polarity through the load 13 in a known manner. More precisely, the power terminal 11 connects through the load 13 to the anode of the ignitron 14 and to the cathode of the ignitron 14a while the power terminal 12 connects to the anode of the ignitron 14a and cathode of the ignitron 14.

A firing circuit, generally indicated at 16, is provided to cause conduction of the ignitron 14 at a preselected point on the positive half-cycle, referring to the power terminal 11, of the input wave form appearing across the power terminals 11 and 12. A firing circuit 16a which is preferably identical to the firing circuit 16, is provided to cause conduction of the ignitron 14a at a preselected point on the negative half-cycle, referring to the power terminal 11, of the input wave form appearing across the power terminals 11 and 12. Since the firing circuit 16 and 16a are preferably identical, only the firing circuit 16 will be described in detail hereinbelow. Parts of the firing circuit 16a corresponding to parts of the firing circuit 16 will carry the same reference numerals thereas with the suffix "a" added thereto. The firing circuit 16 includes an SCR 17 and means connecting same between the anode line 21 and the ignitor 22 of the ignitron 14. Such means may be of any conventional construction and here comprises a reactance coil 23, a resistance 24 and a switch 25 in series between the anode of the SCR 17 and the anode line 21 of the ignitron 14. The cathode of the SCR 17 is directly connected to the ignitor 22 of the ignitron 14 and a capacitance 26 and resistance 29 are connected in series across the anode and cathode of said SCR 17. The coil 23, resistances 24 and 29 and capacitor 26 act in a substantially conventional manner to smooth the voltage applied to the anode of the SCR 17 from the power terminals 11 and 12 at least to some extent. The switches 25 and 25a are closed by any convenient means, not shown, when it is desired to energize the load 13 and in currently known welding machines such closure is accomplished with the initiation of the welding timer of the machine. The switches 25 and 25a may be opened after the welding operation is completed to prevent spurious energizing of the welding transformer.

The gate and cathode of the SCR 17 are connected to the signal terminals 27 and 28, respectively. Any convenient means, not shown, may be connected across the terminals 27 and 28 for rendering the gate of the SCR 17 positive with respect to the cathode thereof at a predetermined point in the supply voltage wave form appearing across terminals 11 and 12. When the terminal 27 is positive with respect to the terminal 28 and the power terminal 11 is positive with respect to the power terminal 12, the SCR 17 will conduct. The conduction path of the SCR 17 commences with the terminal 11, extends through the load 13, the switch 25, resistance 24 and reactor 23 to said SCR 17, thence through the ignitor 22 and pool 31 of the ignitron 14 to the power terminal 12. As a result of such conduction through the SCR 17, sufficient current flows through the ignitor 22 to establish a cathode spot in the pool 31 whereby the ignitron fires due to the positive potential on its anode lead 21. The firing circuit 16a works similarly to but out of phase with the above-described firing circuit 16. More particularly, the terminal 27a and hence the gate of the SCR 17a will be rendered positive when the power terminal 12 is positive with respect to the power terminal 11 whereby the SCR 17a conducts from the power terminal 12 through the switch 25a, resistance 24a, reactance 23a and then through the ignitor 22a and pool 31a of the ignitron 14a, through the load 13 and finally to the power terminal 11. In this manner, the ignitrons 14 and 14a fire on alternate half-cycles of the supply voltage across the terminals 11 and 12.

Turning now to the protective circuitry embodying the invention, a portion 36 thereof is connected between the anode of the SCR 17 and the cathode line 32 of the ignitron 14. The circuitry 36 comprises a diode 37 having its cathode connected to the anode of the SCR 17 and having its anode connected to the anode of a Zener diode 38. The cathode of the Zener diode connects to the line 32. The Zener diode 38 is of a type having its Zener voltage well below the reverse voltage level at which the SCR 17 will be destroyed. As a result, reverse voltages, such as high voltage transients, which would normally be applied through the pool 31 and ignitor 22 to the cathode of the SCR 17 are now bypassed around said SCR 17 through the Zener 38 and diode 37. On the other hand, the Zener point of the Zener diode 38 should be sufficiently high as to prevent excessive current flow therethrough and, hence, through the reactance 23 and resistance 24, during normal negative half-cycles of the voltage of the alternating current source connected across the power terminals 11 and 12. For example, said Zener point may be set at the normal source peak voltage.

The diode 37 prevents current flow from the anode of the SCR 17 through the Zener diode 38 in a forward direction which current flow would effectively short out the SCR 17 when the power terminal 11 is positive with respect to the power terminal 12. Due to the diode 37, the circuitry 36 has no effect on the firing circuit 16 when the anode of the SCR 17 is positive with respect to the cathode thereof. As a result, the circuitry 36 acts only to prevent excessively high reverse voltages from being applied across the SCR 17 and in the preferred embodiment of FIGURE 1 similarly prevents application of reverse voltages of excessive magnitude across the pool 31 and ignitor 22 of the ignitron 14.

While the circuitry 36 above described protects the SCR 17 and the ignitron 14 against reverse transient voltages, said circuitry 36 does not protect the SCR 17 against excessive forward voltage transients thereacross. Although said forward transients may not damage the SCR 17, it has been found that such forward voltage transients may cause conduction through the SCR 17 when the gate voltage thereof is well below the normal firing potential applied thereto. The substantially conventional reactance 23 and series capacitor 26 and resistance 29 have not fully solved this problem since neither the reactance 23 nor the series resistance 29 and capacitance 26 absorb, to the required extent, transients applied thereto. The capacitance 26, for example, if placed across the SCR 17 without the series resistance 29 would satisfactorily absorb forward voltage transients but its post-transient discharge would result in excessive, though momentary, current flow through the SCR 17 upon the next conduction thereof. Such excessive current may damage the SCR 17. To prevent such excessive current flow, it has been a conventional practice to supply the resistance 29 in series with the capacitor 26. However, the series capacitor 26 and resistance 29 cannot completely prevent application of forward transient voltages to the SCR 17 because the resistance 29 in reducing the discharge current capability of the capacitor 26 must, by the same token, reduce its charging current capability. Hence, the capacitor 26 at least cannot be charged rapidly enough through the series resistance 29 to fully absorb high magnitude forward transients having rapid rise times which are a type of forward transients which may cause spurious conduction of the SCR 17.

The circuit of the present invention does not depend fully upon the afore-mentioned reactance 23, capacitance 26 and resistance 29 to prevent high forward transient voltages from being applied to the SCR 17 but rather provides the improvement comprising a series capacitor 43 and resistance 44 connected between the anodes of the SCR's 17 and 17a. Thus, an excessive voltage transient appearing on anode of the SCR 17 will act to charge the capacitor 43 through the resistance 44. Capacitor 43 thus absorbs the transient voltage before spurious conduction of the SCR 17 can be caused thereby. Cessation of the transient voltage allows discharge of the capacitor 43 through the reactances 23 and 23a, resistances 44, 24 and 24a and switches 25 and 25a and, if neither of the ignitrons 14 and 14a are conducting, through the terminals 11 and 12 and load 13. Thus, it will be seen that the discharge of the capacitor 43 is effected without in any way affecting the operation of the SCR's 17 and 17a.

Together, the Zener diodes 38 and 38a, the diodes 37 and 37a, the capacitor 43 and resistance 44 comprise a single network 45 capable of preventing application of both forward and reverse transient voltages to the SCR's 17 and 17a, the portions of the circuit 45 concerned with forward transients being, of course, compatible with those portions concerned with reverse transients. The network 45 is of a π configuration having one leg defined by the series diode 37 and Zener diode 38, a second leg defined by the series diode 37a and Zener diode 38a and a bight connecting the upper ends of the legs defined by the capacitor 43 and resistance 44. The network 45 is insertable as a unit into the power circuit 10 by connection of only four points therein to said power circuit. More specifically, the free ends 39 and 39a of the legs thereof are connected to the pools 31 and 31a and the intersections 41 and 41a of said legs with said bight are connected to the anodes of the SCR's 17 and 17a.

*Modification*

Figure 2:
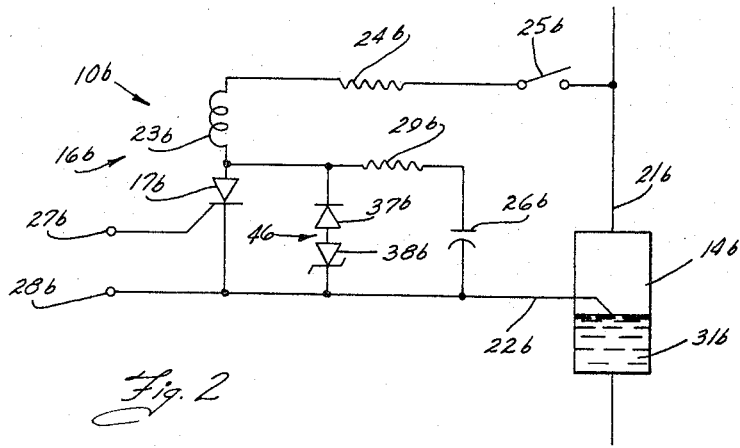
FIGURE 2 is a schematic diagram of an ignitron circuit including a modified form of the protective circuitry disclosed in FIGURE 1.

FIGURE 2 discloses a modified fragment of the circuitry disclosed in FIGURE 1. Parts of the circuitry of FIGURE 2 corresponding to parts of that shown in FIGURE 1 are disclosed by the same reference numerals with the suffix "b" added thereto and need no further discussion. Thus, it will be noted that the circuitry of FIGURE 2 is substantially similar to that of FIGURE 1 except for the circuitry 46 of FIGURE 2 which is intended to protect the SCR 17b against reverse transient voltages. The circuitry 46 is substantially similar to the circuitry 36 of the embodiment of FIGURE 1 except that the anode end of the Zener diode 38b is connected to the ignitor 22b of the ignitron 14b. The same protection against reverse transient voltages is thus afforded the SCR 17b as is afforded the SCR 17 of FIGURE 1. However, the circuitry 46, unlike the circuitry 36, does not provide reverse transient protection to the ignitor pool portion of the SCR 17.

Although particular preferred embodiments of the invention have been disclosed above for illustrative purposes, it will be understood that variations or modifications thereof which lie within the scope of the appended claims are fully contemplated.

What is claimed is:

1. In a circuit for applying successive at least partial half-cycles of alternating polarity to a load from a power source and through a pair of inverse parallel connected ignitrons, each of said ignitrons having an SCR connected between the anode and the ignitor thereof for controlling the conduction thereof, protective circuitry comprising in combination:

reverse transient controlling means connected between the anode of each said SCR and the cathode of one of said SCR and said ignitron controlled thereby, said reverse voltage controlling means being of a type blocking forward current flow therethrough and capable of passing only reverse voltages above a predetermined voltage level for preventing application of said reverse transient voltages above said voltage level across said SCR's;

chargeable means and means connecting said chargeable means between the anodes of said SCR's so that excessive forward voltage transients appearing on the anodes of said SCR's charges said chargeable means rather than causing conduction through said SCR's;

whereby said SCR's are protected against excessive reverse and forward voltage transients.

2. A protective circuit for an SCR connected between the anode and ignitor of an ignitron, said ignitron having a source of alternating voltage connected across the anode and cathode thereof, comprising in combination:

uni-directional current blocking means for blocking current flow therethrough in one direction at any forward voltage drop expected across the SCR and for freely allowing current flow therethrough in the opposite direction;

current controlling means in series circuit with said uni-directional means and capable of preventing current flow therethrough in said opposite direction until the voltage drop thereacross reaches a preselected point at which point said current controlling device conducts only sufficiently that said voltage drop thereacross does not rise above said point; and means connecting said series circuit, comprising said uni-directional means and said current controlling means, at one end to the anode of said SCR and at the other end to the cathode of one of said SCR and ignitron for shunting excessive reverse voltages around said SCR without modifying forward voltage drops thereacross.

3. In a firing circuit for an ignitron connected in series with a load and a source of alternating potential, the combination comprising:

an SCR and means connecting the anode thereof to the anode of said ignitron;

means connecting the cathode of said SCR to the ignitor of said ignitron;

signal means connectible to the gate and cathode of said SCR for starting conduction therethrough when the anode of the SCR is positive with respect to the cathode thereof;

a block diode, the cathode of said blocking diode being connected to the anode of said SCR and a Zener diode having an anode connected to the anode of said diode and having a cathode connected to the cathode of said ignitron;

whereby the appearance of transient reverse voltages of a magnitude capable of destroying said SCR are shunted therearound through said diode and said Zener diode.

4. In an ignitron firing circuit arranged to alternatively cause conduction of a pair of ignitrons connected in inverse parallel relation in circuit with a welding head and an alternating potential source for energizing said head with rectified welding current, said ignitron firing circuit comprising a pair of SCR's each connected between the anode and ignitor of a corresponding ignitron and oriented anode to anode therewith for firing said ignitron upon conduction, a four terminal protection network for protecting said welding ignitron firing circuit from spurious transient voltages, comprising in combination:

a bight portion comprising series resistance and capacitance connected between first and second terminals;

a first leg comprising a series diode and Zener diode connected back to back between said first terminal and a third terminal;

a second leg comprising a further series diode and Zener diode connected between said second terminal and a fourth terminal;

said first and second terminals connected to the anodes of said SCR's and said third and fourth terminals connecting to the pools of said ignitrons;

whereby said first and second legs limit reverse voltage transients applied across the SCR's and corresponding ignitor-pool junctions, respectively, and said bight portions reduce forward voltage transients applied across said SCR's to prevent unintended firing of said SCR's and ignitrons by such forward voltage transients.

5. In a circuit for applying successive at least partial half-cycles of alternating polarity to a load from a power source and through a pair of inverse parallel connected ignitrons, the combination comprising:

a pair of SCR's, each connected across the anode and ignitor electrodes of a respective one of said ignitrons, the anode of said SCR being connected to the anode of the corresponding ignitron through a series inductive-resistive link to reduce the amplitude of transient voltages applied to said SCR;

signal means connectible to the gate and cathode of said SCR for starting conduction therethrough when the anode of the SCR is positive with respect to the cathode thereof;

a Zener diode connected between the pool of each ignitron and the anode of the corresponding one of said SCR's, the anode of said diode being oriented toward said cathode for shunting reverse current around the ignitor-pool junction of the ignitron to minimize transient effects thereon and around the SCR to limit reverse transient voltages applied thereto, the Zener voltage of said Zener diode exceeding the normal supply voltage applied thereacross but not the reverse voltage limit of said SCR;

a diode in series with said Zener diode across said ignitor-pool junctioin and SCR for blocking forward conduction through said Zener diode to prevent said Zener from influencing forward current flow through said SCR and ignitor-pool junction;

a first series capacitor-resistor networks each connected across a corresponding one of said SCR's for partially reducing high forward voltage transients applied to said SCR's when nonconductive, to lessen the chance of spurious conduction by said SCR's due to such forward voltage transients;

a second series capacitor-resistor network connected directly between the anodes of said SCR's for providing a low impedance path away from the anode of either SCR for high forward transient voltage applied thereto, through the other of said SCR's when conductive and alternatively through the anode circuit thereof.

References Cited

UNITED STATES PATENTS

| 2,547,228 | 4/1951 | Owens et al. | 321—14 X |
|---|---|---|---|
| 3,119,951 | 1/1964 | Davy | 317—49 X |
| 3,129,341 | 4/1964 | Rockafellow | 328—8 X |

FOREIGN PATENTS

| 1,357,095 | 2/1964 | France. |
|---|---|---|

MILTON O. HIRSHFIELD, *Primary Examiner.*

J. D. TRAMMELL, *Assistant Examiner.*